(No Model.)

W. A. TURNER.
SHEET METAL KNOB.

No. 511,178. Patented Dec. 19, 1893.

Witnesses
Walter S Bowen
E Converse

Inventor
William A Turner

By his Attorney
Rufus B Fowler

UNITED STATES PATENT OFFICE.

WILLIAM A. TURNER, OF WORCESTER, MASSACHUSETTS, ASSIGNOR TO EDMUND CONVERSE, OF SAME PLACE.

SHEET-METAL KNOB.

SPECIFICATION forming part of Letters Patent No. 511,178, dated December 19, 1893.

Application filed December 20, 1890. Serial No. 375,297. (No model.)

*To all whom it may concern:*

Be it known that I, WILLIAM A. TURNER, a citizen of the United States, and a resident of Worcester, in the county of Worcester and State of Massachusetts, have invented certain new and useful Improvements in Sheet-Metal Knobs, of which the following is a specification.

My invention relates primarily to that class of knobs used for dampers or registers, but it also embodies certain features which are equally applicable to sheet metal knobs used for other purposes.

Figure 1:
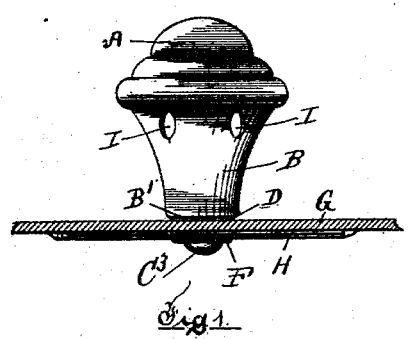
Figure 2:
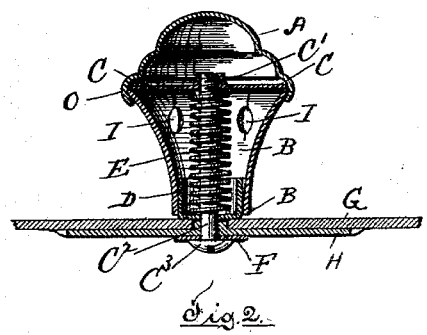
Figure 3:
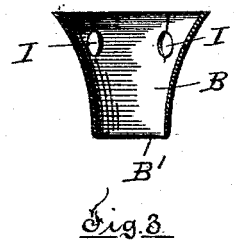
Figure 4:
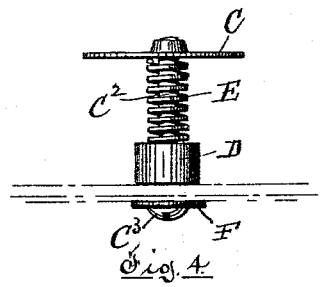
Figure 5:
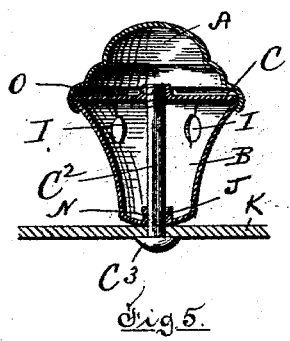

Referring to accompanying drawings, Figure 1, represents a damper knob connected with a sliding register plate and embodying my invention. Fig. 2, is a vertical sectional view of the same. Fig. 3, is a central sectional view of the base. Fig. 4, is a detached view of the attaching bolt and connected parts, and Fig. 5, is a central sectional view of a sheet metal knob embodying so much of my invention as relates to the use of the disk C, the spring E, and washer D, having been omitted, with the attaching bolt passing through a concentric opening in the closed end of the knob.

Similar letters refer to similar parts in the different figures.

I have represented in Figs. 1, and 2, an elevation and sectional view of a damper or register knob, which is shown as applied to a sliding damper or register plate. The body of the knob consists of a crown section A, and a base section B, which are united together by turning the flanged edge of the crown section over the upper or larger end of the base section in the usual manner of manufacturing this class of knobs. Resting upon the larger end of the base B, is a disk C, provided with a central screw threaded hole for the bolt $C^2$, by which the knob is attached to the damper or register. The smaller end of the base B, is left entirely open as represented at B', in Figs. 2, and 3, and inclosed within the smaller end of the base is a cup shaped washer D, having a central opening through which the attaching bolt $C^2$, passes. Between the cup shaped washer D, and the disk C, and surrounding the attaching bolt $C^2$, is a spiral spring E, whose tension serves to force the cup shaped washer D, out of the base B, until it is caught by the head $C^3$, of the attaching bolt $C^2$. The sides of the cup shaped washer D, are therefore made higher than the distance between the smaller and open end of the base B, and the head $C^3$. In applying the knob to a register the cup shaped washer D, rests upon the stove plate G, and the attaching bolt $C^2$, is passed through a hole in the sliding register plate H, and through the cup shaped washer D, and a spiral spring E, and is screwed into the disk C, compressing the spring E, and pushing the cup shaped washer D, into the base B, thereby increasing the tension of the spring E, and holding the sliding register plate H, against the plate G. The amount of compression of the spring E, can readily be determined by observing the distance which the cup shaped washer D, projects out of the open end of the base B, and the compression of the spring is limited by the contact of the open end B', of the base B, with the plate G. The base B, is provided with ventilating holes I, to allow free circulation of air through the interior of the knob and prevent the undue heating of the spring E. If for any reason the elasticity of the spring E, becomes lost the attaching bolt $C^2$, can be withdrawn allowing the washer D, and spring E, to be removed and a new spring inserted. The attaching bolt $C^2$, is made to fill the hole in the center of the cup shaped washer D, and the cup shaped washer D, is made to fill the open end B', of the base B, so as to prevent any lateral movement of the knob upon the bolt $C^2$, and securing two independent bearings of the knob upon its attaching bolt namely: at the smaller end of the base B, and at the center of the disk C, the knob being attached to the register plates by means of the bolt $C^2$, and disk C, while its lower end is held from lateral movement by means of the cup shaped washer D. The knob by this means of attachment is enabled to withstand a lateral strain upon the knob itself better than those knobs which are attached at the lower or smaller ends of the base only.

F denotes a washer interposed between the head $C^3$, and the register plate H.

In Fig. 5 I have illustrated a metal knob in which that feature of my present invention embodied in the disk C, is shown as applicable to the ordinary sheet metal knob in which the disk C rests upon the larger end of the base B, and the base B, is provided with a closed bottom N having a central hole J, through which the attaching bolt $C^2$, passes having a screw threaded section screwing in to the center of the disk C, and thereby drawing the knob firmly against the plate K.

In Figs. 2 and 5 the disk C, is held from longitudinal movement within the knob by means of the edge of the disk resting upon the larger end of the base B, and being held in contact therewith by a bead O, in the crown A. The disk C, is of the same diameter as the outside diameter of the larger end of the base section B, of the knob and in uniting the crown section A, with the base section B, the edge of the crown section A, is turned over the edge of the disk C, and the larger end of the base section B, thereby uniting the crown section A, base section B, and disk C, together in one completed knob by a single operation, the diameter of the disk C, and the outer diameter of the larger end of the base section B, being the same, the presence of the disk C, facilitates the operation of uniting the crown and base sections in the manner described and the strain exerted by the attaching bolt is received upon the larger end of the base section B, in the plane of the largest diameter of the knob, so that the pressure by which the knob is held against the plate K, in Fig. 5, is exerted upon the annular edge of the base section B, and parallel with the axis of the attaching bolt.

What I claim as my invention, and desire to secure by Letters Patent, is—

1. In a sheet metal knob, the combination with a base and a crown section united together to form the body of the knob, of a disk held from longitudinal movement within the body of the knob and a screw threaded bolt passing through the end of the base section of the knob and engaging a concentric opening in said disk, substantially as described.

2. In a sheet metal knob the combination of the flaring or bell-shaped base section B, a circular disk C, having a concentric screw threaded hole and resting upon the edge of the larger end of said base section B, a crown section A, united to said base section by its edge, whereby said disk is securely locked between said base and said crown sections and held from longitudinal movement, a washer D, held in the smaller end of said base section, a spiral spring E, interposed between said disk and said washer, with its tension applied to force said washer out of the base section and an attaching bolt passing concentrically through said washer and said spring and engaging the screw threaded concentric hole in said disk, substantially as described.

Dated at Worcester, in the county of Worcester and State of Massachusetts, this 18th day of December, 1890.

WILLIAM A. TURNER.

Witnesses:
RUFUS B. FOWLER,
E. CONVERSE.